Oct. 24, 1933.  C. S. HALL  1,932,135
LID FOR PRESSURE RESISTING VESSELS IN WHICH FLUIDS
ARE STORED OR GENERATED UNDER PRESSURE
Filed Feb. 6, 1933  2 Sheets-Sheet 1
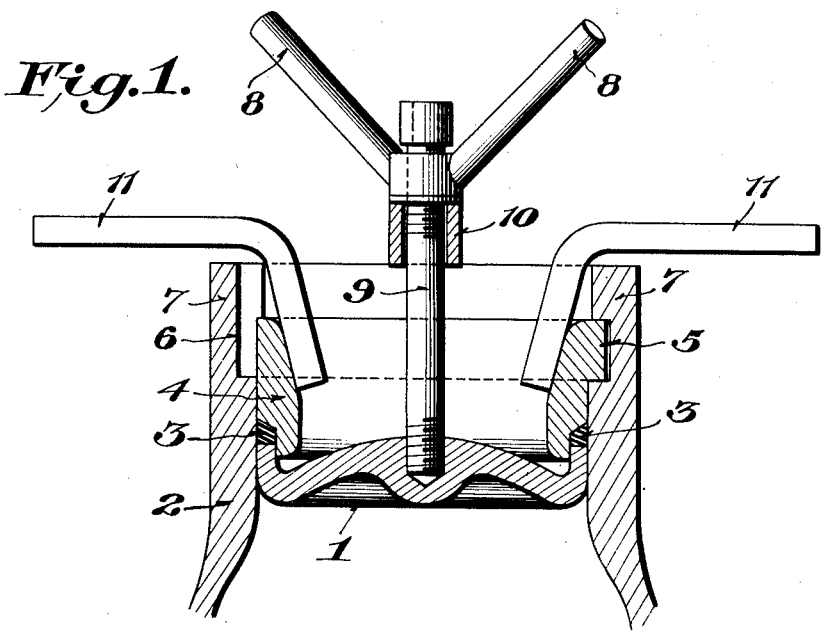
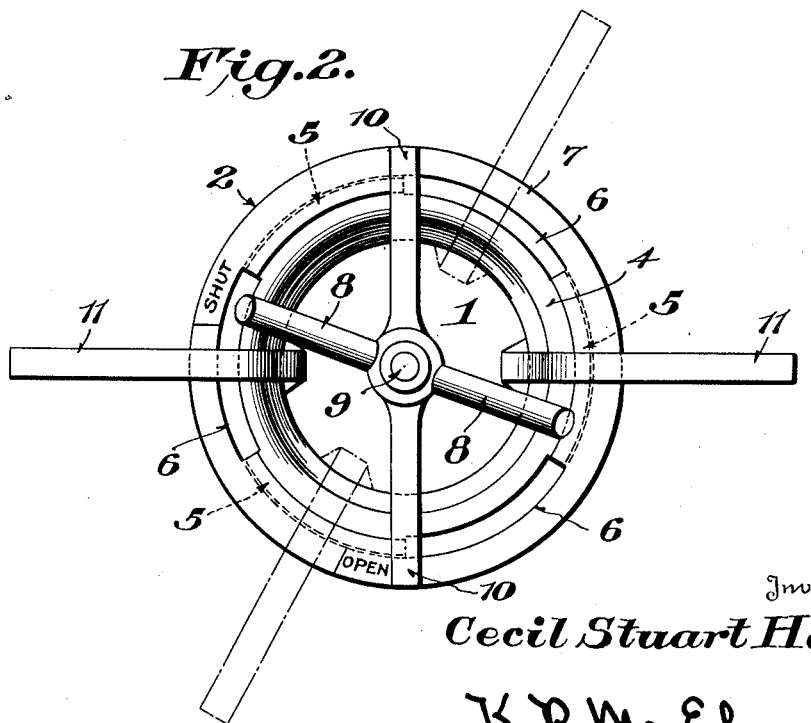
Inventor
Cecil Stuart Hall,
By K. P. McElroy
Attorney Oct. 24, 1933.                     C. S. HALL                    1,932,135
         LID FOR PRESSURE RESISTING VESSELS IN WHICH FLUIDS
             ARE STORED OR GENERATED UNDER PRESSURE
                    Filed Feb. 6, 1933          2 Sheets-Sheet 2
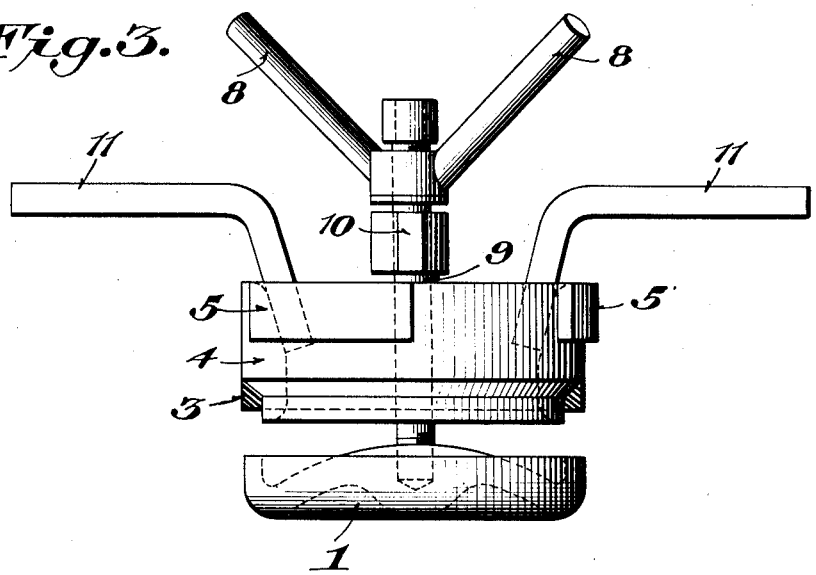
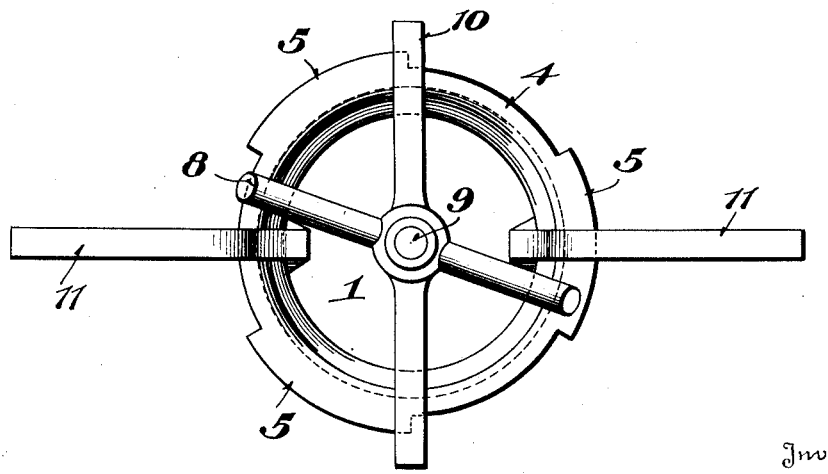
Inventor
Cecil Stuart Hall,
By K. P. McElroy
Attorney Patented Oct. 24, 1933

1,932,135

UNITED STATES PATENT OFFICE 1,932,135

LID FOR PRESSURE-RESISTING VESSELS IN WHICH FLUIDS ARE STORED OR GENERATED UNDER PRESSURE

Cecil Stuart Hall, Norton-on-Tees, England, assignor to Imperial Chemical Industries Limited, a corporation of Great Britain Application February 6, 1933, Serial No. 655,502, and in Great Britain February 3, 1932

4 Claims. (Cl. 220—57)

This invention relates to lids for pressure-resisting vessels in which fluids are stored or generated under pressure, and in particular to lids for pressure-resisting vessels of a type suitable for the liquefaction or gasification of solid carbon dioxide. The principal object of the invention is to provide a construction such that the lid may be easily and rapidly removed and replaced manually.

According to the invention, I arrange a gasket in contact with the outer rim of the lid, with the wall of the pressure-resisting vessel and with an open following ring, which is inserted in the mouth of the vessel and which is adapted to be locked by rotation through a portion of a turn only, so as to be incapable of outward movement. The portion of the following ring in contact with the gasket is beveled outward. The rim of the lid is then brought tightly to bear on the gasket by means of a screwed bolt which is secured to the centre of the lid and which carries at its outer end a nut which can be screwed down on an intermediate cross-piece or other supporting member which is incapable of substantial inward movement. The gasket is compressed between the lid and the following ring and is forced laterally against the wall of the vessel, forming a tight seal. The following ring may be an unthreaded ring having arcuate flanges adapted to lock under corresponding arcuate shoulders formed on the inside wall of the vessel, or it may have an interrupted thread as in a breech block, corresponding threads being provided in the vessel.

In the accompanying drawings I have shown, more or less diagrammatically, a lid device within my invention. In these drawings, Fig. 1 is a view partly in elevation, partly in section, of the mouth of a pressure-resisting vessel showing the lid device in position;

Fig. 2 is a plan view corresponding to Fig. 1;

Fig. 3 is a view in elevation showing the following ring and the lid, with the gasket in section; and Fig. 4 is a plan view corresponding to Fig. 3.

Referring to these figures, reference numeral 1 denotes the lid, 2 the wall of the pressure-resisting vessel and 4 a following ring. The lower part of the following ring is provided, as shown (see Fig. 1) with a recessed, beveled groove. This groove is adapted to cooperate with the edge of the lid 1 to form a chamber. A gasket 3 is positioned in this chamber, as shown. This following ring is open, as shown, and is provided with three symmetrically placed shoulders 5 which fit in corresponding arcuate, recessed shoulders 6 in the wall 7 of the vessel 2. Handles 11 are fixed to the ring 4 to enable it to be turned through a sufficient angle to disengage the shoulders 5 from the recesses 6 when it is desired to remove the lid.

The lid 1 is tightly pressed against the gasket 3 by means of the screwed bolt 9, the outer end of which carries a winged nut 8, which can be screwed down on a cross-piece 10 which is seated across the mouth of the vessel 2. To remove the lid, the nut 8 is slackened sufficiently to enable the ring 4 to be turned by the handles 11, and the shoulders 5 disengaged from the recesses 6, when the whole arrangement can be lifted out of the mouth of the vessel.

When the lid is replaced, the nut 8 is screwed down hard to force the gasket to expand into the surrounding interstices. Under compression, the beveled edge of the groove of the following ring wedges the gasket, so to speak, against the wall of the vessel. When the joint is thus made the development of pressure inside the vessel itself assists the sealing force and tends to make the joint tighter.

I claim:

1. A lid device for sealing pressure-resisting vessels having a cylindrical-walled mouth and retaining means in the walls of the mouth, said device comprising in combination a pressure-resisting lid adapted to fit snugly in the mouth, an open following ring adapted to fit snugly in the mouth above the lid and having retaining means cooperating with the retaining means in the mouth and allowing ready attachment and detachment of the following ring, the ring having in its lower portion an annular bevel-edged groove adapted to cooperate with the lid to form an annular chamber between the walls of the mouth of the vessel, the lid and the ring, a peripheral gasket positioned in this chamber and means, supportable on and bearing upon the vessel, for tightening the lid against the ring through the interposed gasket, wedging the gasket outwardly against the walls of the mouth and forming a tight seal.

2. A device as set forth in claim 1, in which the means for tightening the lid against the ring comprise a rigid, readily removable cross member supportable on the vessel and handled screw means connecting the lid with the cross member and adapted to allow the lid to be pulled up against the locking ring, towards the cross member.

3. A device as set forth in claim 1, in which the retaining means comprise arcuate, recessed shoulders in the mouth of the vessel flush with the walls thereof, arcuate projections on the ring engageable therewith, and arcuate vertical recesses in the walls of the mouth whereby the ring may be dropped into position vertically and upon being turned through a portion of a circle is locked in place.

4. A device as set forth in claim 1, wherein the retaining means comprise interrupted threads in the mouth of the vessel and corresponding interrupted threads on the ring.

CECIL STUART HALL.